UNITED STATES PATENT OFFICE.

WILLIAM M. RUTHRAUFF, OF TUCSON, ARIZONA.

DENTIFRICE.

1,133,250.

Specification of Letters Patent. Patented Mar. 23, 1915.

No Drawing.

Application filed June 16, 1914. Serial No. 845,504.

*To all whom it may concern:*

Be it known that I, WILLIAM M. RUTH-RAUFF, a citizen of the United States, residing at Tucson, in the county of Pima and State of Arizona, have invented certain new and useful Improvements in Dentifrices, of which the following is a specification.

The cause of all the diseases of the teeth arises primarily from the precipitation or depositing of a protein or mucin film upon the teeth. This mucin film harbors bacteria, which generate lactic acid and etch out the surface of the tooth under the film, roughing the tooth and causing decay. It also harbors pathogenic bacteria which irritate the gums causing them to lose their vitality, and also their elasticity, which causes them, in health, to fit snugly around the neck of the tooth. This elastic condition, once lost, a pocket is formed which permits mucin deposit to form under the gums. When the gum is sufficiently irritated, a calculus deposit is produced which usually is removable only by scaling. This further irritates the gums, and the process, unless interrupted by careful instrumentation by a dentist, continues until the aveolar tissue in which the tooth is set has been destroyed to such extent that the tooth loosens and finally is lost. This process of destruction is produced by pathogenic bacteria, and often is a source of danger to the health of the individual.

The prime purpose of my invention is to dissolve the mucin film as it collects upon the tooth before any harm can be done. Consequently there is no breeding ground for the bacteria, and no need for strong germicidal agents, usually employed in tooth pastes.

A special formula for and method of manufacturing my compound is as follows: Take any quantity of tri-calcium phosphate, say 28 av. oz., and triturate in it 2½ dr. oil of peppermint. Then add and mix thoroughly, 4 dr. gum tragacanth and 12 dr. sugar. To this add 16 fl. oz. solution of pepsin acidulated with hydrochloric acid, not to exceed 5%, such as any standard commercial essence of pepsin. An addition of a desired quantity of petroleum jelly to the above tends to prevent evaporation, and adds slightly to the smoothness of the mixture, though this is not essential.

The hydrochloric acid combines with some of the tri-calcium phosphate, forming acid calcium phosphate, which renders the pepsin active as a digestant of the protein or mucin films. This acid calcium phosphate by virtue of the fact that it will not act chemically upon the tri-calcium phosphate, the principal constituent of the enamel of the tooth, is not deleterious. When the compound is applied to the teeth the pepsin dissolves the protein constituent and thereby disintegrates the deposits which harbor acid producing and pathogenic bacteria.

The abrasive agent (tri-calcium phosphate) breaks up the protein or mucin film into such finely divided particles that the pepsin will quickly dissolve them, though action of pepsin on solid protein is rather slow. In the case of calculus deposits, the pepsin breaks down the protein binder which holds the calcium particles forming the deposit together, thus causing it to disintegrate. The calcium phosphate is sufficiently hard to cause the abrasion of the calcium deposit but not hard enough to cause injury to the enamel of the teeth, consequently its abrasive action with the solvent action of the pepsin is quickly effective. I do not, however, claim that my compound is efficient in all cases of calculus deposits, since there may be cases where instrumentation would be advisable or necessary, and in fact in most cases of well established calculus deposits instrumentation would be advisable. My invention is primarily directed to the prevention and removal of protein or mucin films, though in some cases it may remove calculus deposits also, especially where these have not proceeded too far.

The excess of neutral tri-calcium phosphate reacts with the lactic or other free acids of the mouth, thereby counteracting their deleterious action and forming additional acid calcium phosphate. The remaining tri-calcium phosphate by its abrasive action aids mechanically in removing the disintegrated deposits as above pointed out.

The compound further stimulates the secretion of alkaline saliva which rapidly affects the complete neutralization of any remaining acid calcium phosphate and establishes a natural alkaline and sanitary condition of the mouth.

In the foregoing formula the oil of peppermint is merely a flavoring, and while it is desirable to provide an agreeable flavor to the compound, this element forms no essential part of my invention. Wintergreen, cinnamon, a combination of essential oils similar to listerine, or any other suitable essential oil or flavoring may be employed within the scope of my invention. The sugar mentioned in the formula here given is not at all essential and may be omitted entirely, and if any sweetening in addition to that supplied by the flavoring is desired, this may be of any suitable kind. I also do not limit my invention to the use of gum tragacanth which constitutes merely a binding agent for the purpose of preventing the separation of the solution of pepsin and the calcium phosphate, for which may be used gum arabic, slippery elm, or other suitable binding agent. I may also substitute within the scope of my invention for the pepsin mentioned in the foregoing formula other digestive ferments for the purpose of dissolving the protein deposit on the teeth, and in the accompanying claims I use the term "proteolytic enzyme" as covering generically such substances. All of these except certain enzymes such, for example, as pancreatin, may be used in the same way as the pepsin, in combination with acid calcium phosphate. Pancreatin however, must be used in either a neutral or alkaline base. This could be used with the tri-calcium phosphate, a neutral base, precipitated calcium carbonate, precipitated chalk, carbonate of magnesia, milk of magnesia or any other alkaline base. It is therefore within the scope of my invention to use as a base substances other than calcium phosphate. I also do not limit my invention to the use of acid calcium phosphate for the purpose of acidulating the pepsin or other proteolytic enzymes requiring an acid vehicle. Any acid which is inert to calcium phosphate (will not chemically affect the enamel of the teeth) may be used for this purpose, including those fruit or vegetable acids which are natural vehicles for those proteolytic enzymes derived from certain fruits or vegetables. As expressing the strength of these enzymes, I might say that they should be equivalent in protein solvent properties to the quantity of pepsin employed in the above formula. As these solutions are all standardized in terms of their solvent power the proper strength for my compound may be readily determined.

The foregoing compound may be made up in a powder, paste or any other desired form.

What I claim is:

1. A proteolytic dentifrice containing a proteolytic enzyme, and an agent to render said enzyme active as a digestant of dental mucin films, and which agent is inert to calcium phosphate.

2. A proteolytic dentifrice containing a proteolytic enzyme, and an agent to render said enzyme active as a digestant of dental mucin films, which agent is inert to calcium phosphate, and an abrasive which will not chemically interfere with said digestive action.

3. A proteolytic dentifrice containing a proteolytic enzyme, and an acid inert to calcium phosphate and which acts to render said enzyme active as a digestant of dental mucin films.

4. A proteolytic dentifrice containing pepsin, an acid inert to calcium phosphate and which acts to render said pepsin a digestant of dental mucin films, and an abrasive which will not chemically interfere with said digestive action.

5. A proteolytic dentifrice containing pepsin acidulated with acid calcium phosphate to render the pepsin a digestant of dental mucin films.

6. A proteolytic dentifrice containing pepsin acidulated with acid calcium phosphate to render the pepsin active as a digestant of dental mucin films, and calcium phosphate as an abrasive.

In testimony whereof I affix my signature in presence of two witnesses.

WILLIAM M. RUTHRAUFF.

Witnesses:
  Wm. J. Bryan, jr.,
  A. M. McDonald.